(12) United States Patent
Bader et al.

(10) Patent No.: US 7,878,942 B2
(45) Date of Patent: Feb. 1, 2011

(54) METHOD FOR SHIFTING ACTUATION OF AN AUTOMATED TRANSMISSION

(75) Inventors: Josef Bader, Friedrichshafen (DE); Andreas Graf, Stockach-Wahlwies (DE); Martin Miller, Immenstaad (DE); Mario Steinborn, Friedrichshafen (DE); Thomas Hafen, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 365 days.

(21) Appl. No.: 12/207,027

(22) Filed: Sep. 9, 2008

(65) Prior Publication Data

US 2009/0071274 A1    Mar. 19, 2009

(30) Foreign Application Priority Data

Sep. 15, 2007    (DE) .................. 10 2007 043 694

(51) Int. Cl.
  *B60W 10/00*    (2006.01)
(52) U.S. Cl. .................................................. 477/78
(58) Field of Classification Search ............. 477/77, 477/78, 908
  See application file for complete search history.

(56) References Cited

U.S. PATENT DOCUMENTS

| | | | | |
|---|---|---|---|---|
| 4,527,447 A | * | 7/1985 | Richards | 477/78 |
| 5,441,462 A | * | 8/1995 | Chan | 477/74 |
| 6,042,504 A | * | 3/2000 | Gualtieri et al. | 477/111 |
| 6,044,721 A | * | 4/2000 | Genise | 74/335 |
| 6,250,172 B1 | * | 6/2001 | Pigozzi et al. | 74/336 R |
| 6,878,097 B2 | * | 4/2005 | Lemon | 477/109 |
| 7,021,170 B2 | | 4/2006 | Döbele | |
| 7,121,979 B2 | * | 10/2006 | Steen et al. | 477/111 |
| 7,621,844 B2 | * | 11/2009 | Kishi | 477/120 |
| 2007/0288150 A1 | | 12/2007 | Schnitzer | |
| 2009/0071277 A1 | * | 3/2009 | Bader et al. | 74/336 R |
| 2009/0239704 A1 | * | 9/2009 | Steinborn et al. | 477/4 |

FOREIGN PATENT DOCUMENTS

| | | |
|---|---|---|
| DE | 101 52 857 A1 | 6/2003 |
| DE | 10 2004 055 857 A1 | 6/2006 |
| EP | 0 769 641 A1 | 4/1997 |
| WO | WO-99/00612 | 1/1999 |

OTHER PUBLICATIONS

"Die ZF-AS-Tronic-Familie", Automatische Getriebe für alle Nutzfahrzeugklassen, *Zeitschrift ATZ* Sep. 2004, pp. 772-783.

* cited by examiner

*Primary Examiner*—Dirk Wright
(74) *Attorney, Agent, or Firm*—Davis & Bujold, P.L.L.C.

(57) ABSTRACT

A method for shifting an automated transmission situated in a drive train of a motor vehicle between an engine and a drive axle and having at least one multi-speed main transmission and a two-speed range change group rear-mounted thereon. The main transmission has at least one counter-shaft with an transmission brake. A clutch engages the prime mover and the main transmission and the range change group is shifted via unsynchronized dog clutches, which are combined in pairs in a common shift set having two shift positions and one neutral position such that during a range change gearshift, both in the main transmission and in the range change group, a change between two ratio stages occurs. A range change up-shift and down-shift each include active synchronization of the dog clutch by way of the transmission brake and of the separating clutch.

13 Claims, 4 Drawing Sheets

METHOD FOR SHIFTING ACTUATION OF AN AUTOMATED TRANSMISSION

This application claims priority from German Application Serial No. 10 2007 043 694.9 filed Sep. 15, 2007.

FIELD OF THE INVENTION

The invention concerns a method for shifting actuation of an automated group transmission situated in a drive train of a motor vehicle between a prime mover and an axle drive and comprising at least one multi-speed main transmission and one two-speed range change group rear-mounted thereon, and in which the main transmission is constructed in countershaft design having at least one countershaft provided with an actuatable transmission brake, the input shaft is connected with the prime mover, via an actuatable separating clutch and the main transmission, the same as the range change group, are each actuatable via unsynchronized dog clutches combined in pairs in a common gearset having two shift positions and one neutral position wherein, during a range change gearshift both in the main transmission and in the range change group a shift occurs between two ratio stages.

BACKGROUND OF THE INVENTION

Group transmissions having one multi-speed main transmission and one splitter group front-mounted thereon by transmission technology, the same as one range change group rear-mounted by transmission technology on the main transmission, have been known for a long time and used preferably in industrial vehicles. By a splitter group, generally designed with two speeds, having one ratio change corresponding to approximately one half of a central ratio change between two consecutive ratio stages of the main transmission. The ratio changes of the main transmission are halved and the number of gears of the group transmission available is doubled. By a usually two-speed range change group with one ratio change covering the whole speed ratio change of the main transmission approximately by a medium ratio jump between two consecutive ratio stages of the main transmission, the range of the whole transmission is about doubled and the number of gears of the group transmission available is again doubled. Relative to a three-speed main transmission (having three forward gears and one reverse gear), this results in a 12-gear group transmission with a total of twelve forward gears and a maximum of four reverse gears and relative to a four-speed main transmission having four forward gears and one reverse gear, a 16-gear group transmission with a total of sixteen forward gears and a maximum of four reverse gears. Such a group transmission has, in comparison with a singe-unit transmission having a similar number of gears and similar gradation and range, a clearly more compact dimensions and lighter weight. But since in a group transmission many gearshifts require the change of ratio stages in many parts and thus the sequence is relatively complicated, most group transmissions known are designed either partly automated or fully automatedly shiftable.

A general view of the Applicant's automated group transmission has been published in the periodical "ATZ9/2004", pages 772-783. From the line of products of automated shift transmissions designated as the AS-Tronic Family are the transmission of the AS-Tronic middle line of products produced for medium heavy industrial vehicles and the transmissions of the AS-Tronic line of products provided for heavy industrial vehicles respectively designed as group transmissions with one multi-speed, that is, main transmissions provided with three or four forward gears, a two-speed splitter group front-mounted on the main transmission and a two-speed range change group rear-mounted on the main transmission. The main transmission is constructed with countershaft design, provided with unsynchronized dog clutches and has, in the case of the AS-Tronic middle line of products, a single countershaft, the same as in the case of the AS-Tronic line of products, two countershafts for reasons of weight and space optimization. In both lines of products, the main transmission is optionally designed with a direct gear ($i_{HG\_min}=1$). The splitter group is designed as a countershaft with two shiftable high ratios ($i_{HG\_min}<1$). The splitter group is designed as a countershaft with two shiftable input constants for the main transmission. The range change group is designed as a two-speed, planetary transmission with one shiftable direct gear ratio ($i_{GP}=1$) or a high gear ratio ($i_{GP}\gg 1$).

A group transmission with one multi-speed main transmission having a countershaft design, one splitter group front-mounted thereon with two shiftable input constants of the main transmission and one range change group rear-mounted on the main transmission in planetary construction has moreover been disclosed in WO 1999/00612 A1. This known group transmission, when equipment with a different toothed gear pair forming an input constant of the main transmission, can optionally be designed as direct gear transmission or as high gear transmission. EP 0 769 641 B1 describes an alternative group transmission with one two-speed main transmission of countershaft construction (with two forward gear speeds and one reverse gear speed), one three-speed splitter group front-mounted thereon and one range change group rear-mounted on the main transmission in planetary construction.

The group transmissions of "the AS-Tronic" line of products and of the AS-Tronic middle line of products, have been built with synchronized shift clutches of the splitter group and of the range change group combined in a common shift set, whereas the main transmission was designed to be controlled by a dog clutch, that is, shiftable by way of unsynchronized clutches. But since the concerned synchronized separating clutches, due to a complicated construction, are comparatively expensive and require a relatively large space and, due to wear, the lifetime of the whole group transmission is limited. Future designs of such group transmission could be provided to design dog shifted, together with the main transmission and the range change group.

In such a group transmission, due to the unsynchronized design of the range change group, a special shift sequence is required which clearly differs from that of a group transmission which, to a great extent, is identical, but is provided with a synchronized range change group. An adequate method for shift actuation of a group transmission, having an unsynchronized range change group, has been suggested in DE 101 52 857 A1. In this method it is provided, in essence, that in a range shift the front-mounted group is first shifted together with the range change group to interrupt the energy flow in their neutral position, the main transmission is then decelerated by way of a transmission brake and subsequently there begins a change of the rotational speed of the prime mover to the synchronized rotational speed of the target gear. After shifting the main transmission, the front-mounted group is synchronized to its target ratio stage. When the synchronous rotational speed is reached by the prime mover, the target ratio stage of the range change group is activated.

It is, of course, disadvantageous in this known method that the presence of a front-mounted group or a splitter group front-mounted on the main transmission is assumed and that the shift sequence can only be used in a range change upshift, the same as the reaching of the synchronized rotational speed by the prime mover to be expected prior to activation of the target ratio stage is delayed.

With this background, this invention provides an improved method to overcome the problems of actuating shifts of an automated group transmission of the above mentioned kind, which is suitable for carrying out range upshifts and range downshifts which, compared to the already known method, makes a faster shift sequence possible and which can also be used in group transmission, which have no front-mounted group or no splitter group front-mounted on the main transmission.

SUMMARY OF THE INVENTION

The invention departs from a method for shift actuation of an automated group transmission situated in a drive train of a motor vehicle between a prime mover and an axle drive and which comprises at least one multi-speed main transmission and one two-speed range change group rear-mounted thereon and in which the main transmission is constructed in countershaft design with at least one countershaft provided with an actuatable transmission brake, the input shaft is connected via an actuatable separating clutch with the prime mover and the main transmission, the same as the range change groups, can each be shifted via unsynchronized dog clutches combined in pairs in a common shift set with two shifting positions and one neutral position wherein, during a range shift both in the main transmission and in the range change group, a respective change occurs between two ratio stages.

The solution of the problem concerning a range change upshift consists in that the range change upshift is carried out with the following steps:

| | |
|---|---|
| SH1) | load reduction of the prime mover, |
| SH2a) | de-activation of the actual ratio stage of the range change group GP = N and |
| SH2b) | full disengagement of the separating clutch, |
| SH3a) | synchronizing of the target ratio stage of the range change group by actuation of the transmission brake and |
| SH3b) | beginning of the actuation of the prime mover to the target rotational speed of the input shaft, |
| SH4) | activation of the target ratio stage of the range change group |
| SH5) | de-activation of the actual ratio stage of the main transmission, |
| SH6) | synchronizing of the target ratio stage of the main transmission by partial engagement of the separating clutch, |
| SH7) | activation of the target ratio stage of the main transmission, |
| SH8a) | full engagement of the separating clutch and |
| SH8b) | load buildup of the prime mover. |

In the inventive method, the point of departure from what is known will be accordingly an automated group transmission situated in a drive train of a motor vehicle between the prime mover and a drive axle and which comprises at least one multi-speed main transmission HG, HG' and one two-speed range change group GP rear-mounted thereon by drive technology. The main transmission HG, HG' is, as known in the group transmissions, constructed in countershaft design and has, together with one input shaft $W_{GE}$, which is connected with the prime mover via an actuatable separating clutch K and one main shaft $W_H$, at least one countershaft $W_{VG1}$, $W_{VG}$ provided with an actuatable transmission brake Br. The main transmission HG, HG' and the range change group GP are each shiftable via unsynchronized clutches combined by pairs in a common shift set S1, S2, SP and S1', S2', S3', SP having two shift positions and one neutral position N.

In such a group transmission, a range change shift is known to include in the main transmission HG, HG' and the range change group GP respectively one change between two ratio stages. The main transmission HG, HG' and the range change group GP are upshifted from the slow speed L to the fast speed S in a range change upshift.

In order to complete this in the fastest and most comfortable manner possible, it is knowingly provided that after an extensive load decrease in the prime mover (method step SH1), the actual ratio stage (low speed L) of the range change group GP is first de-activated (method step SH2a), that is, the range change group GP is shifted to the neutral position N (GP=N) and essentially simultaneously the separating clutch K is entirely disengaged (method step SH2b, K=0). Thereafter, by adequately actuating the transmission brake (Br>0). The countershaft $W_{VG1}$ or $W_{VG}$ and the main shaft $W_H$ which is connected therewith via the still activated actual ratio stage G3, G4' of the main transmission HG, HG', are decelerated and thus the target ratio stage (fast speed S) of the range change group GP is synchronized (method step SH3a). Almost simultaneously begins actuating the prime mover to the target rotational speed of the input shaft $W_{GE}$ or the total ratio of the target gear (method step SH3b).

When reaching the synchronous rotational speed of the shift clutch concerned, the target ratio stage (high speed S) of the range change group GP is activated (method step SH4) and approximately at the same time or subsequently thereafter the actual ratio stage G3, G4' of the main transmission HG, HG' is de-activated (method step SH5), that is, the main transmission HG, HG' is shifted to its neutral position (HG=N or HG'=N). The target ratio stage G1, G1' of the main transmission HG, HG' is then synchronized by a partial engagement of the separating clutch (K>0) by an accelerating of the input shaft $W_{GE}$ (method step SH6).

When the corresponding shift clutch reaches the synchronous rotational speed, the target ratio stage G1, G1' or the main transmission HG, HG' is activated (method step SH7) before the separating clutch K is completely engaged (method step SH8a, K=1) and the load reduction of the prime mover takes place (method step SH8b).

The inventive method can be used in the above described manner both in a group transmission without a front-mounted group or without a front-mounted splitter group GV and in a group transmission with a front-mounted group or with a front-mounted splitter group GV, where in a range change upshift, the splitter group is not shifted.

When, as usual, in a multi-speed main transmission HG, HG', the lowest ratio stage G1, G1' and the highest ratio stage G3, G4 are coordinated with different shift sets S1, S2; S1', S2' or shift gates, in the range change upshift within the main transmission HG, HG' a gate change is additionally required, that is, a shift of the main transmission HG, HG', a gate change is additionally required, that is, a shift of the main transmission HG, HG' to the shift gate of the target ratio stage. This shift of the shift gate conveniently takes place approximately at the same time as the synchronization of the target ratio stage of the main transmission HG, HG', that is, parallel to the method step SH6.

For further acceleration of the shifting sequence, it is convenient that de-activation of the actual ratio stage G3, G4' of the main transmission HG, HG' occurs before activation of the target ratio stage S of the range change group GP when therefore the method step SH5 is carried out prior to method step SH4.

Thereby shifting of the main transmission HG, HG' to the shift gate of the target ratio stage G1, G1', which in a main transmission HG, HG' is required with a coordination of the lowest ratio stage G1, G1' and the highest ratio stage G3, G4' with different shift sets S1, S2; S1', S2' or shift gates, can already occur approximately at the same time as activation of the target ratio stage S of the range change group GP, that is, coincident to the method step SH4 whereby the total shifting sequence is further shortened.

For further acceleration of the shifting sequence, the rotational speed adaptation of the prime mover is supported at the same time as the synchronization of the target ratio stage G1, G1' of the main transmission HG, HG' in the method step SH6 by actuation of the transmission brake (Br>0).

When the group transmission is provided with a synchronized shiftable two-speed group front-mounted on the main transmission HG by drive technology, and the splitter group GV has to be likewise shifted during the range change upshift, the shift of the splitter group GV can optionally occur immediately after de-activation of the actual ratio stage G3, G4' of the main transmission HG, HG', that is, after method step SH5, or occur simultaneously with the synchronization of the target ratio stage G1, G1' of the main transmission HG, HG', that is, coincident to the method step SH6.

The solution of the problem concerning a range change downshift departs from a method for shift actuation of an automated group transmission located in a drive train of a motor vehicle between the prime mover and an axle drive and comprises at least one multi-speed main transmission and one two-speed range change group rear-mounted thereon by drive technology and in which the main transmission in countershaft design is provided with at least one countershaft equipped with an actuatable transmission brake, the input shaft is connected with the prime mover via an actuatable separating clutch and the main transmission, the same as the range change group, can be shifted via unsynchronized dog clutches combined in pairs in a common shift set having two shift positions and one neutral position, wherein during a range change gearshift both in the main transmission and in the range change group, a respective change occurs between two ratio stages.

According to the invention the range change reverse gearshift is carried out with the following steps:

| | |
|---|---|
| SR1) | load reduction of the prime mover, |
| SR2a) | de-activation of the actual ratio stage of the main transmission and |
| SR2b) | complete disengagement of the separating clutch, |
| SR3a) | synchronizing of the target ratio stage of the main transmission by an actuation of the transmission brake and |
| SR3b) | beginning of the actuation of the prime mover to the target rotational speed of the input shaft, |
| SR4a) | activation of the target ratio stage of the main transmission and |
| SR4b) | de-activation of the actual ratio stage of the range change group, |
| SR5) | synchronizing of the target ratio stage of the range change group (GP) by partial engagement of the separating clutch, |
| SR6) | activation of the target ratio stage of the range change group, |
| SR7a) | complete engagement of the separating clutch and |
| (SR7b) | load buildup of the prime mover. |

In a range change downshift, contrary to a range change upshift, the main transmission HG, HG' is upshifted from the lowest ratio step G1, G1' to the highest ratio step G3, G4' and the range change group GP is shifted in reverse from the fast running step S to the slow running step L.

In order that this be accomplished in the fastest and most comfortable way possible, it is provided, according to the invention, that after a load reduction of the prime mover extensively occurring (method step SR1), the actual ratio stage G1, G1' of the main transmission HG, HG' is shifted to its neutral position N (HG=N or HG'=N) and that the separating clutch K be again disengaged approximately simultaneously (method step SR2b, K=0). Thereafter by adequate actuation of the transmission brake (Br>0), the countershaft $W_{VB1}$ or $W_{VG}$, the same as the input shaft $W_{GE}$ connected therewith via an input constant (K1, K2; K0) are decelerated and thus the target ratio stage G3, G4' of the main transmission HG, HG' is synchronized (method step SR3a).

About the same time begins actuating the prime mover to the target rotational speed of the input shaft $W_{GE}$ for the total ratio of the target gear (method step SR3b). When reaching the synchronous rotational speed on the shift clutch concerned, the target ratio stage G3, G4' of the main transmission HG, HG' is activated (method step SR4a) and about the same time the actual ratio state (fast running step S) of the range change group GP is de-activated (method step SR4b), that is, the range change group GP is shifted to its neutral position (GP=N).

Subsequently the target ratio stage (slow step L) of the range change group GP is synchronized by partial engagement of the separating clutch (K>0) by acceleration of the input shaft $W_{GE}$ and the main shaft $W_H$ connected therewith via the activated target ratio stage G3, G4' of the main transmission HG, HG' (method step SR5). When reaching the synchronous rotational speed on the corresponding shift clutch, the target ratio stage (slow step L) of the range change group GP is activated (method step SR6) before the separating clutch K has been fully engaged (method step SR7a, K=1) and the load reduction of the prime mover takes place (method step SR7b).

When, in common situation, the lowest ratio stage G1, G1' and the highest ratio stage G3, G4' of the main transmission HG, HG' are coordinated with different shift sets S1, S2; S1', S2' or shift gates, there is in the range change downshift within the main transmission HG, HG' one additional gate change, that is, a shift of the main transmission HG, HG' to the shift gate of the target ratio stage G3, G4', is required. The change of the shift gate conveniently occurs about the same time as the synchronization of the target ratio stage G3, G4' of the main transmission HG, HG', that is, essentially simultaneous to the method step SR3a.

When the group transmission is provided with a synchronized shiftable two-speed shift group front-mounted on the main transmission HG by drive technology, or splitter group GV and the splitter group GV during the range change downshift is to be likewise changed, the change of the splitter group GV conveniently occurs immediately before activation of the target ratio stage G3, G4' of the main transmission HG, HG', that is, accordingly prior to the method step SR4a.

During the load reduction of the prime mover in the momentary first method step SH1 or SR1, the separating clutch K is advantageously partly disengaged already up to above the slip limit. Hereby the separating clutch K can be consecutively disengaged faster since then no more waiting time results for the prior filling of the clutch actuator with a pressure means and for bypassing an idle path of the clutch actuation device.

During activation of the target ratio stage G1, G1' or G3, G4' of the main transmission HG, HG', that is, in the method step SH7 or SR4a, and/or during activation of the target ratio stage S or L of the range change group GP, that is, in the method step SH4 or SR6, if the existence of a tooth-on-tooth position on the dog clutch concerned is found, then the shifting sequence, while maintaining the engagement control force concerned, is conveniently continued, inasmuch as the tooth-on-tooth position is canceled by a relative rotation, which necessarily occurs subsequently, of the transmission shaft ($W_{VG1}$, $W_H$; $W_{VG}$, $W_H$; $W_H$, $W_{GA}$) and the dog clutch can then be engaged without delay of the shifting sequence.

The inventive method essentially relates to the fact that the dog shifted part of the transmission of the group transmission, that is, the main transmission HG, HG' and the range change group GP rear-mounted thereon, are each actively synchronized via actuatable elements such as the transmission brake Br and the separating clutch K. Herefrom results, in relation to the selected sequence of the method steps, a total shifting time as short as possible and a great shift comfort of the range change gearshifts.

However, the inventive method can be used not only in a group transmission having two dog shifted transmission parts (HG, GP; HG', GP) but can also be used in group transmission having only one or absolutely no unsynchronized transmission parts. In other words, all the method steps can also be used in group transmissions having only one synchronized transmission part (HG, GP; HG', GP). In this case, the use of the inventive method serves for releasing and supporting the synchronizations concerned and is particularly convenient under cold, in worn out synchronizations or in other shifting problems appearing for other reasons.

BRIEF DESCRIPTION OF THE DRAWINGS

The invention will now be described, by way of example, with reference to the accompanying drawings in which.

DETAILED DESCRIPTION OF THE INVENTION

Figure 3:
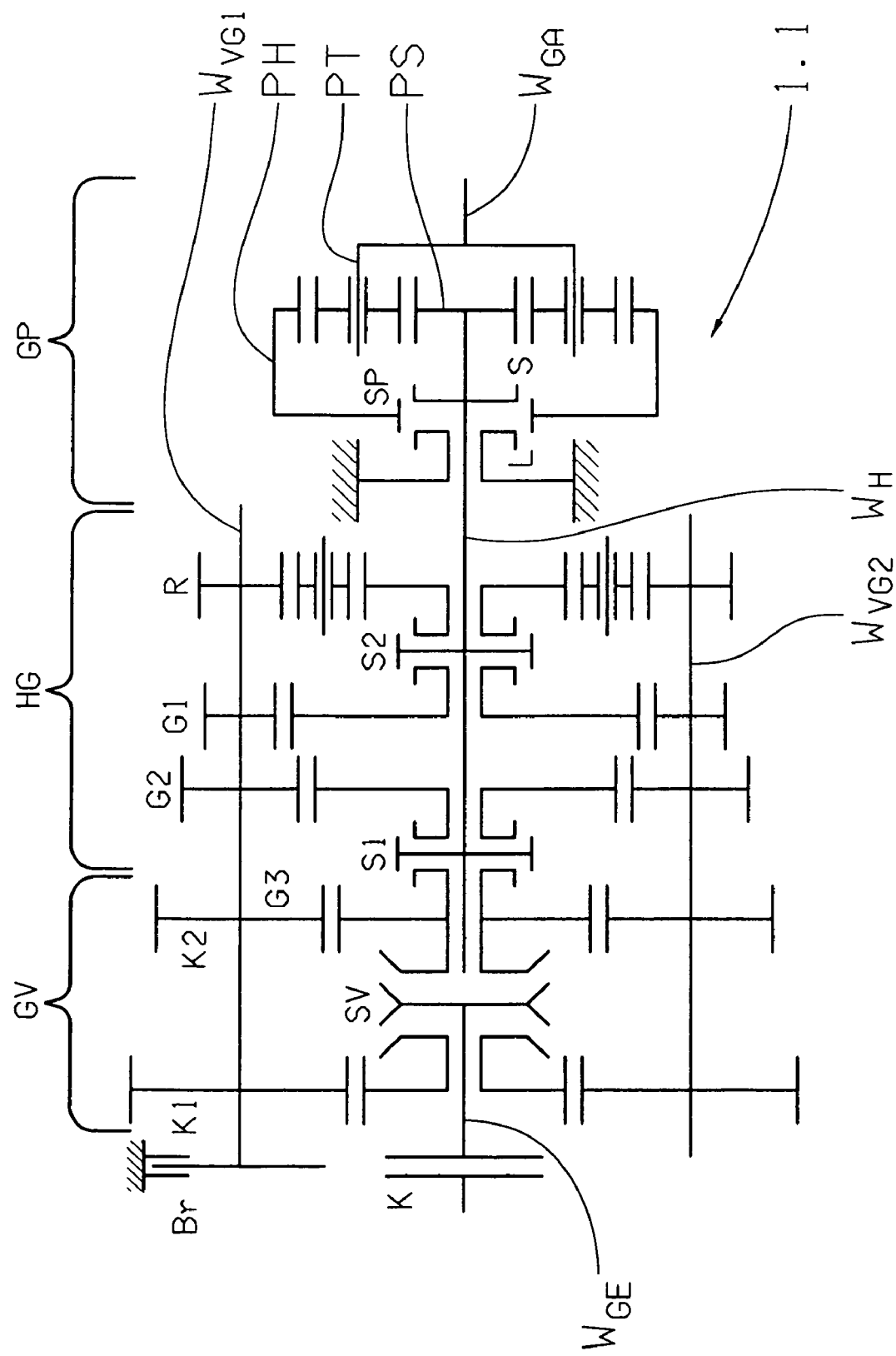
FIG. 3 is a diagrammatic construction of a first group transmission where the inventive method can be used.

In FIG. 3 is shown a group transmission 1.1 where the inventive method can be used. The group transmission 1.1 comprises one main transmission HG, one group GV front-mounted thereon by drive technology and one range change group GP rear-mounted on the main transmission HG and which in its function technical construction extensively corresponds to an embodiment of a group transmission known per se of the AS-Traonic series.

The main transmission HG is constructed in countershaft design and has one main shaft $W_H$ and two countershafts $W_{VG1}$ and $W_{VG2}$ wherein the first countershaft $W_{VG1}$ is coupled with an actuatable transmission brake Br. The main transmission HG is designed with three ratio stages G1, G2, G3 for the forward movement and one ratio stage R for the reverse drive. The idler gears of the ratio stages G1, G2, R are each rotatably placed upon the main shaft $W_H$ and are shiftable by way of coordinated dog clutches. The coordinated fixed gears are non-rotatably situated on the countershafts $W_{VG1}$, $W_{VG2}$. The highest ratio stage G3, designed as a direct gear, is shiftable by a direct shift clutch. The shift clutches of the ratio stages G3, G2 and the shift clutches of the ratio stages G1, R are combined in a common shift set S1, S2.

The front-mounted group GV has a two-speed design and likewise is constructed in countershaft design wherein both ratio stages K1 and K2 of the front-mounted group GV form two shiftable input constants of the main transmission HG. Due to a slight ratio difference of the two ratio stages K1, K2, the front-mounted group GV is designed as a splitter group. The idler gear of the first ratio stage K1 is rotatably supported on the input shaft $W_{GE}$ which is in driving connection, via a separating clutch K, with a prime mover (not shown), constructed as an internal combustion engine. The idler gear of the second ratio stage K2 is rotatably supported on the main shaft $W_H$. The fixed gears of both ratio stages K1, K2 are visibly situated non-rotatably on the input side extent of countershafts $W_{VG1}$, $W_{VG2}$ of the main transmission HG. The synchronized constructed shift clutches of the front-mounted group GV are combined in a common shift set SV.

The range change group GP rear-mounted by drive technology is likewise built of two speeds, but in planetary design, and with a simple planetary gearset. The sun gear PS is non-rotatably connected with the output side extent of main shaft $W_H$ of the main transmission HG. The planet carrier PT is non-rotatably coupled with the output shaft $W_{GA}$ of the group transmission. The ring gear PH of the planetary gearset is connected with a shift set SP having two shift clutches whereby the range change group GP is alternatively shiftable by the connection of the ring gear PH with a fixed housing part to form a slow drive speed L and by the connection of the ring gear PH with the main shaft $W_H$ or the sun gear PS to form a fast speed S. Contrary to the former design of the AS-Tronic transmission, the shift clutches of the shift set SP are here designed unsynchronized.

Herebelow is explained with reference to the diagram of FIG. 1, an inventive sequence of a range change upshift carried out in the group transmission 1.1. according to FIG. 3. In the upper part of FIG. 1 are reproduced the time sequences of the rotational speed $n_m$ of the prime mover, the rotational speed $n_{GE}$ of the input shaft $W_{GE}$, the rotational speed $n_{VG}$ of the first countershaft $W_{VG1}$, the rotational speed $n_H$ of the main shaft $W_H$ and the rotational sped $n_{GA}$ of the output shaft $W_{GA}$.

Figure 1:
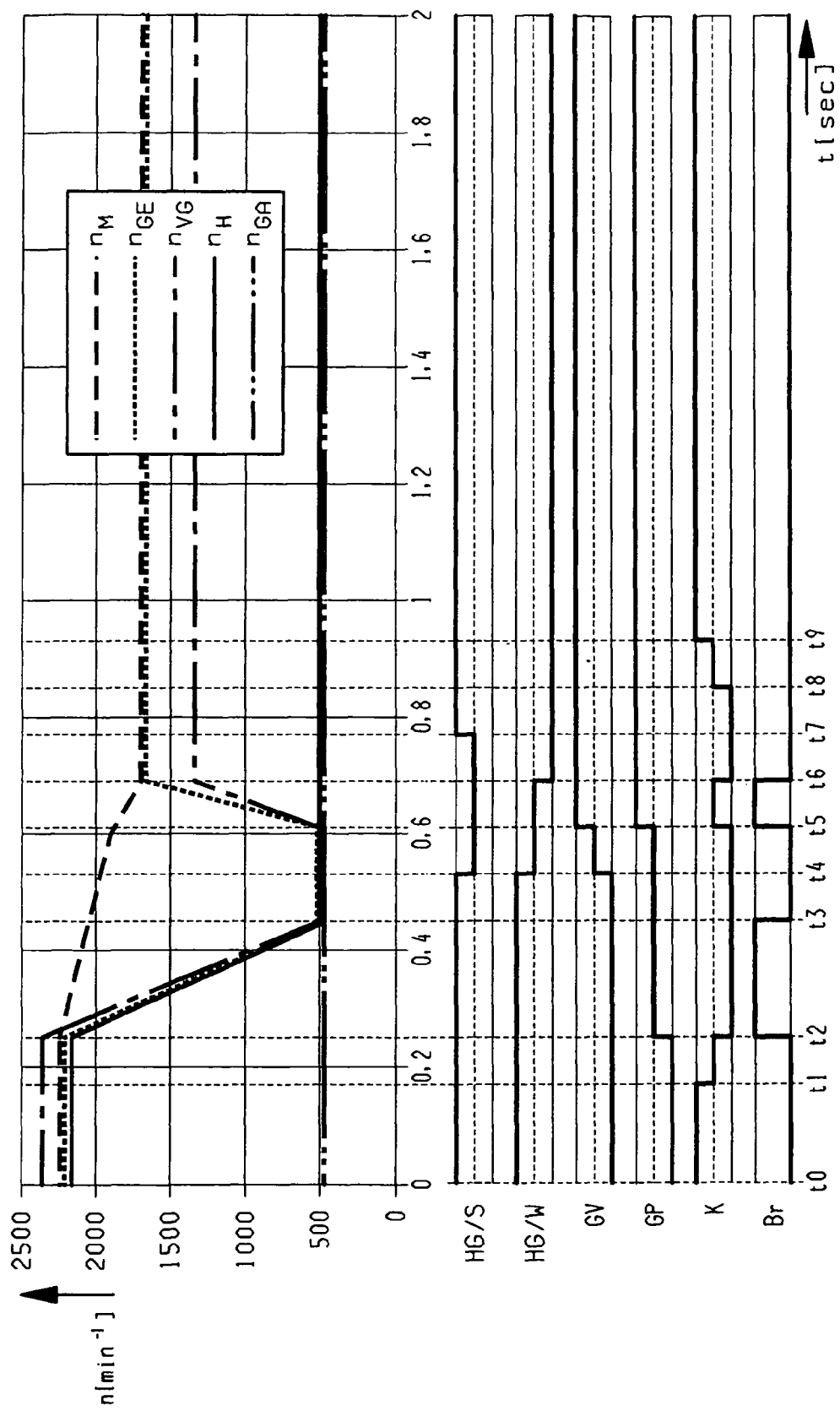
FIG. 1 is a preferred sequence of a range change upshift according to the inventive method in the form of a simplified time diagram.

In the lower part of FIG. 1, the actuation operations of the transmission elements are schematically shown. Under the designation HG/S is the shifting operation within the main transmission HG such as the de-activation of the actual ratio stage G3 and the activation of the target ratio stage G1. Under the designation HG/W is the selective operations within the main transmission HG, that is, the change of the shift gate or of the shift set from S1 to S2. Under the designation GV is the shifting operation of the ratio stages from K2 to K1 within the splitter group GV. Under the designation GP is the shifting operations within the range change group GP such as de-activation of the actual ratio stage L and activation of the target ratio stage S. Under the designation K is an actuation or the engagement of the separating clutch K and under the designation Br is an actuation or the closing of the transmission brake Br.

At the moment t0, load reduction of the prime mover begins which, at the latest, is terminated at the moment t2. About the same time, beginning at the moment t1, the separating clutch K is pre-opened, that is, disengaged to above the slip limit. At the moment t2, the actual ratio stage L of the range change group GP is first de-activated, that is, the range change group GP is shifted to neutral N (GP=N) and essentially simultaneously the separating clutch K is fully disengaged (K=0).

Thereafter, by adequate actuation of the transmission brace Br between the moments t2 and t3, the countershaft $W_{VG1}$ and the main shaft $W_H$ connected therewith via the still activated actual ratio stage G3 of the main transmission HG, are decelerated and therewith the target ratio stage S of the range change group GP is synchronized. Approximately at the same time begins the actuation of the prime mover upon the target rotational speed of the input shaft $W_{GE}$ for the total ratio of the target gear.

After reaching the synchronous rotational speed on the shift clutch SP concerned at the moment t3, at the moment t4 the actual ratio stage G3 of the main transmission main transmission HG is the first de-activated, the change of the shift gate of the main transmission HG from the shift set S1 to the shift set S2 is begun and the synchronized shift of the splitter group GV from the actual ratio stage K2 to the target ratio stage K1 is started.

At the moment t5, the target ratio stage S of the range change group GP is activated. At this moment, the shifting of the splitter group GV via the shift set SV is also terminated. Subsequently, the target ratio stage G1 of the main transmission HG is synchronized by partial engagement of the separating clutch K due to acceleration of the input shaft $W_{GE}$. At the same time, actuation of the transmission brake Br takes care of a delay of the prime mover and thus of an acceleration of the rotational speed adaptation of the prime mover.

After reaching the synchronous rotational speed on the corresponding shift clutch S2 and termination of the gate change at the moment t6, the transmission brake Br is again released and the separating clutch K disengaged. Thereafter the target ratio stage G1 of the main transmission HG is activated at the moment t7 before the separating clutch K between the moments t8 and t9 is again fully engaged and then takes place the load reduction of the prime mover.

Figure 2:
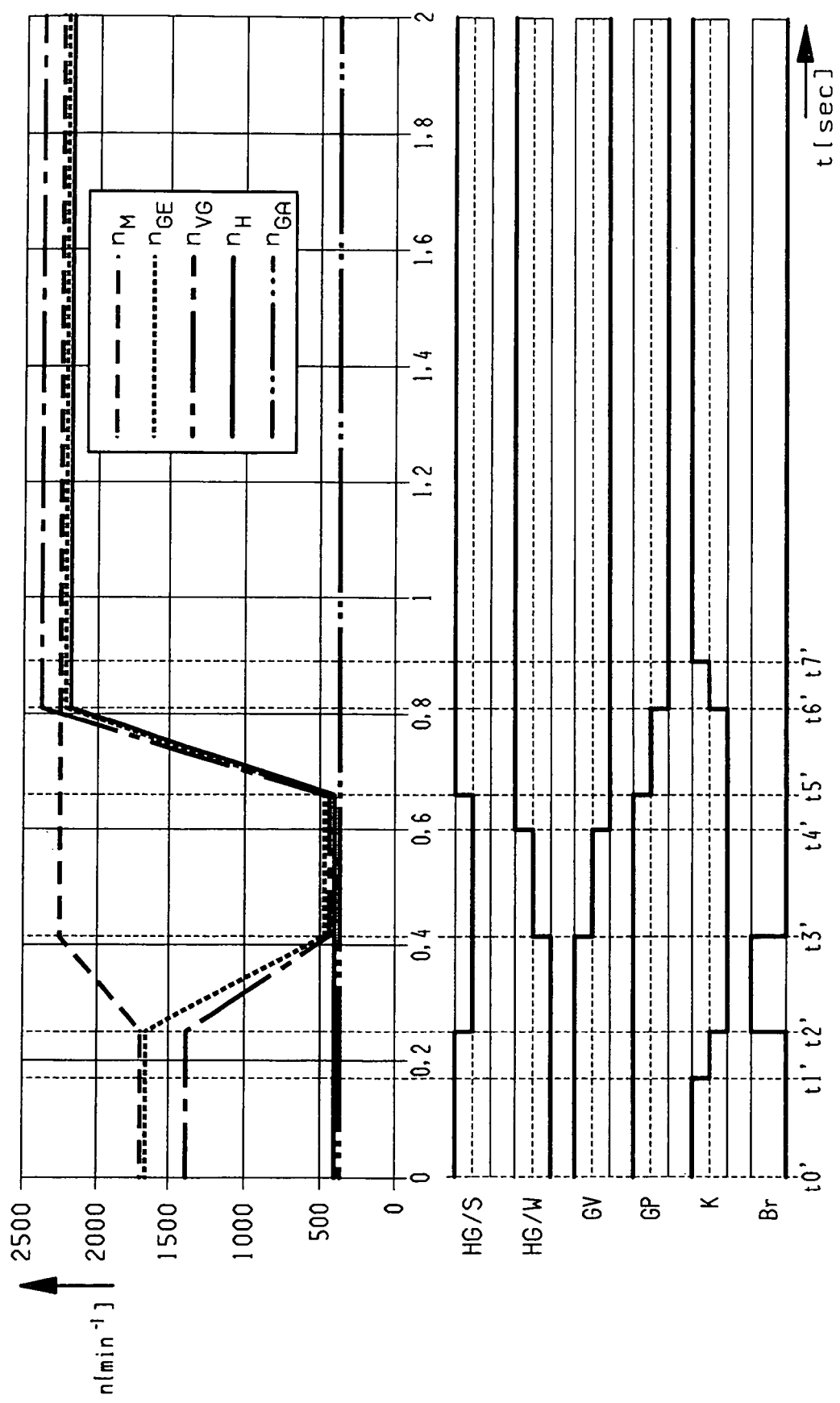
FIG. 2 is a preferred sequence of a range change downshift, according to the inventive method, in the form of a simplified time diagram.

The inventive sequence of a range change downshift in the group transmission 1.1 carried out according to FIG. 3 is explained herebelow with reference to the diagram of FIG. 2 which uses the same manner of representation as in FIG. 1.

At the moment t0' load reduction on the prime mover begins which, at the latest, is terminated at the moment t2'. About the same time thereto, beginning at the moment t1', the separating clutch K pre-opens, that is, disengaged to above the slip limit. At the moment t2', the actual ratio stage G1 of the main transmission HG is first de-activated, that is, the main transmission HG is shifted to its neutral position N (HG=H) and about the same time, the separating clutch K is fully disengaged (K=0).

Thereafter, by a corresponding actuation of the transmission brake Br, between the moments t2' and t3', the countershaft $W_{VG1}$ and the input shaft $W_{GE}$ connected therewith, via the activated actual ratio stage K2, are decelerated and thus the target ratio stage G3 of the main transmission HG is synchronized. About the same time begins actuation of the prime mover to the target rotational speed of the input shaft $W_{GE}$ for the total ratio of the target gear. After reaching the synchronous rotational speed on the concerned shift clutch S1 at the moment t3', there occurs at the moment t4' first the gate change within the main transmission HG, that is, the shifting from the shift set S2 to the shift set S1 and the synchronized shifting of the splitter group GV via the shift set SV from the input constant K1 to the input constant K2.

Thereafter, at the moment t5', the target ratio stage G3 of the main transmission HG is activated and about the same time the actual ratio stage S of the range change group GP is de-activated, that is, the range change group GP is shifted to neutral (GP=N). The target ratio stage L of the range change group GP is then synchronized by partial engagement of the separating clutch (K>0) by acceleration of the input shaft input shaft $W_{GE}$ and the main shaft $W_H$ connected therewith via the activated target ratio stage G3 of the main transmission HG. When reaching the synchronous rotational speed on the corresponding shift clutch SP at the moment t6', the target ratio stage L of the range change group GP is activated before the separating clutch K is fully engaged at the moment t7' and then the load breakdown of the prime mover takes place.

Figure 4:
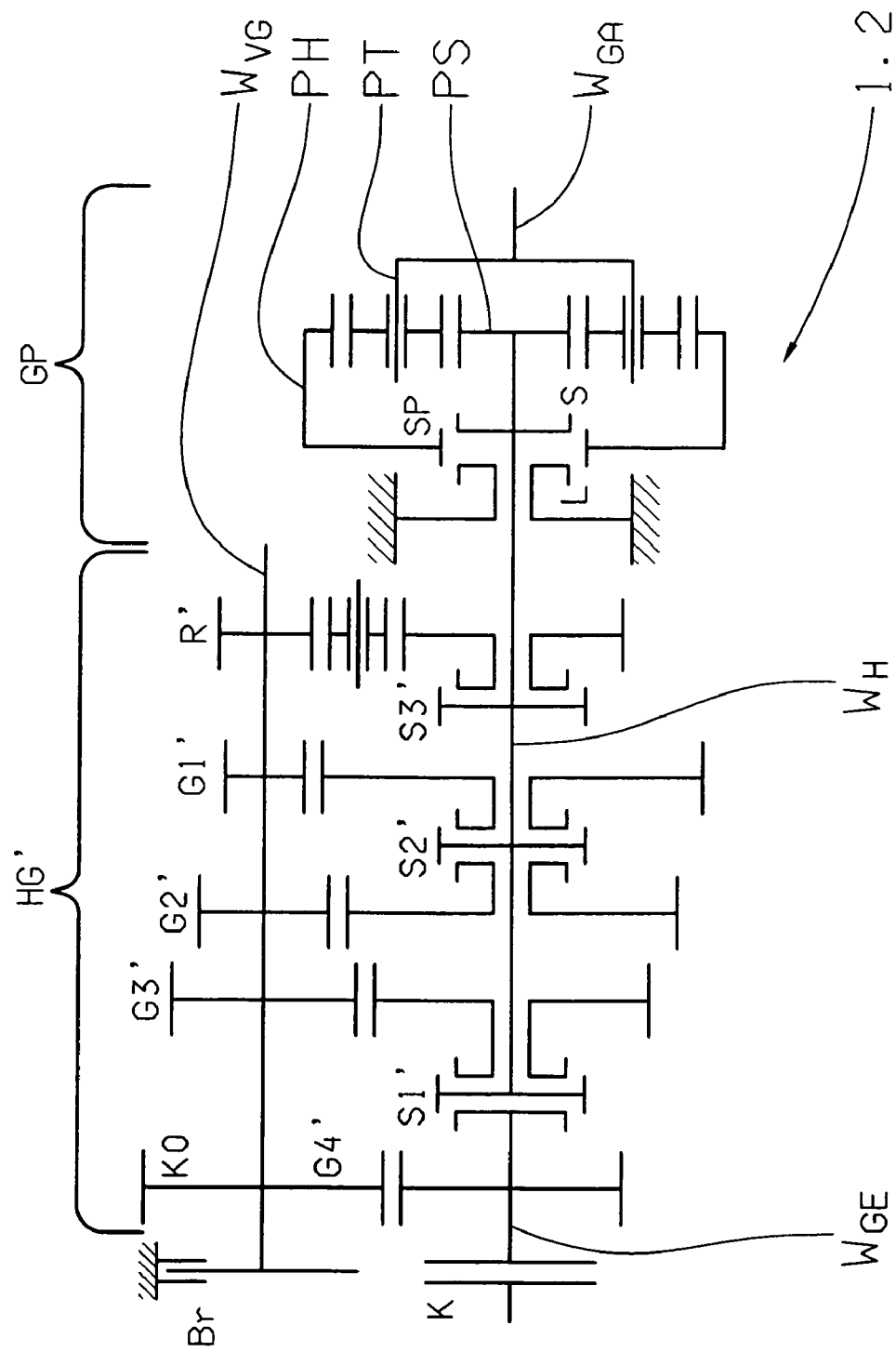
FIG. 4 is a diagrammatic construction of a second group transmission where the inventive method can be used.

One other group transmission 1.2 in which the inventive method can be used is reproduced in FIG. 4. This group transmission 1.2 comprises one main transmission HG' and one range change group GP rear-mounted thereon and extensively corresponding in its function technical construction to an embodiment of a known group transmission for light industrial vehicles.

The main transmission HG' is constructed as a direct gear transmission in countershaft design and has one input shaft $W_{GE}$, one main shaft $W_H$ and one countershaft $W_{VG}$ wherein the countershaft $W_{VG}$ is coupled with an actuatable transmission brake Br. The input shaft input shaft $W_{GE}$ is connected on the input side with a prime mover (not shown), via an actuatable separating clutch K and on the output side is permanently in drive connection with the countershaft $W_{VG}$ via a toothed gear pair forming an input constant K0. The main transmission HG' is designed with four ratio stages G1' to G4' for the forward drive and one ratio speed R' for the reverse speed.

The idler gears of the ratio stages G1', G2', G3', R' are each rotatably supported on the main shaft $W_H$ being shiftable by coordinated dog clutches. The coordinated fixed gears are non-rotatably situated on the countershaft $W_{VG}$. The highest ratio stage G4' designed as direct gear can be shifted by a direct shift clutch. The shift clutches of the ratio stages G4' and G3' and the shift clutches of the ratio stages G2' and G1' are here combined in a common shift set S1' or S2'. A third shift set S3' has only the shift clutch of the ratio stage for the reverse gear R.

The rear-mounted range change group GP corresponds in construction and action to the range change group GP of the group transmission 1.1 according to FIG. 3.

The method sequence described above with reference to FIG. 1 and FIG. 2 for carrying out a range change upshift and a range change downshift can be used identically in the group transmission 1.2 insofar as those method steps concerning the shifting of the splitter group GV are omitted and when instead of the designations for the main transmission HG and the countershaft $W_{VG1}$ thereof, the same as the concerned shift sets S1, S2 and ratio stages G1, G3, according to FIG. 3, the designations for the main transmission HG' and the countershaft $W_{VG}$ thereof, the same as the concerned shift sets S1', S2' and ratio stages G1' G4', according to FIG. 4, are now used. Therefore, a repetition of these method stages known already can be omitted.

| Reference numerals | |
|---|---|
| 1.1 | group transmission |
| 1.2 | group transmission |
| Br | transmission brake |
| GP | range change group |
| GV | splitter group, front-mounted group |
| G1 | first ratio stage of HG |
| G1' | first ratio stage of HG' |
| G2 | second ratio stage of HG |
| G2' | second ratio stage of HG' |
| G3 | third ratio stage of HG |
| G3' | third ratio stage of HG' |
| G4' | fourth ratio stage of HG' |
| HG | main transmission |
| HG' | main transmission |
| HG/S | shifting operation in HG |
| HG/W | selection operation in HG |
| $i_{GV}$ | ratio of GV |

-continued

| Reference numerals | |
|---|---|
| $i_{GP}$ | ratio of GP |
| $i_{HG}$ | ratio of HG |
| K | separating clutch |
| K0 | input constant of HG' |
| K1 | first ratio stage of GV |
| K2 | second ratio stage of GV |
| L | slow drive stage of GP |
| n | rotational speed |
| N | neutral position |
| $n_{GA}$ | rotational speed of $W_{GA}$ |
| $n_{GE}$ | rotational speed of $W_{GE}$ |
| $n_H$ | rotational speed of $W_H$ |
| $n_M$ | rotational speed of the prime mover |
| $n_{VG}$ | rotational speed of $W_{VG1}$, $W_{VG}$ |
| PH | ring gear of GP |
| PS | sun gear of GP |
| PT | planet carrier of GP |
| R | reverse ratio stage of HG |
| R' | reverse ratio stage of HG' |
| S | fast drive stage of GP |
| SP | shift set of GP |
| S1 | first shift set of HG |
| S1' | first shift set of HG' |
| S2 | second shift set of HG' |
| S2' | second shift set of HG |
| S3' | third shift set of HG' |
| SV | shift set of GV |
| SH1-SH8b | method steps in range change upshift |
| SR1-SR7b | method steps in range change reverse gear time |
| t0-t9 | moments in range change upshift |
| t0'-t7' | moments in range change reverse gear |
| $W_{GA}$ | output shaft |
| $W_{GE}$ | input shaft |
| $W_H$ | main shaft |
| $W_{VG}$ | countershaft of HG' |
| $W_{VG1}$ | first countershaft of HG |
| $W_{VG2}$ | second countershaft of HG |

The invention claimed is:

1. A method for shifting an automated group transmission situated in a drive train of a motor vehicle between a prime mover and an axle drive and comprising at least one multi-speed main transmission (HG, HG'), a two-speed range change group (GP) rear-mounted on the at least one multi-speed main transmission (HG, HG'), and the main transmission (HG, HG') is constructed in countershaft design having at least one countershaft ($W_{VG1}$, $W_{VG}$) provided with an actuatable transmission brake (Br), an input shaft ($W_{GE}$) is connected via an actuatable separating clutch (K) with the prime mover, the main transmission (HG, HG') and the range change group (GP), are shiftable via unsynchronized dog clutches combined in pairs in a common shift set (S1, S2, S1'-S3', SP) having two shift positions and one neutral position (N), wherein during a range change gearshift both in the main transmission (HG, HG') and in the range change group (GP) a change between two ratio stages occurs, wherein a range change up-shift comprises the steps of:

reducing (SH1) a load of the prime mover;
disengaging (SH2a) an actual ratio stage of the range change group (GP=N);
fully disengaging (SH2b) the separating clutch (K=0);
synchronizing (SH3a) a target ratio stage of the range change group (GP) by actuation of the transmission brake (Br>0);
initiating (SH3b) actuation of the prime mover to the target rotational speed of the input shaft ($W_{GE}$);
activating (SH4) the target ratio stage of the range change group (GP);
de-activating (SH5) the actual ratio stage of the main transmission (HG=N);
synchronizing (SH6) the target ratio stage of the main transmission (HG) by partially engaging the separating clutch (K>0);
activating (SH7) the target ratio stage of the main transmission (HG);
fully engaging (SH8a) the separating clutch (K=1); and
increasing (SH8b) the load of the prime mover.

2. The method according to claim 1, further comprising the step of essentially simultaneously changing the main transmission (HG, HG') on a shift gate of the target ratio stage and synchronizing the target ratio stage of the main transmission (HG, HG'; SH6) where a lowest ratio stage (G1, G1') and a highest ratio stage (G3, G4') are coordinated with different shift gates.

3. The method according to claim 1, further comprising the step of de-activating the actual ratio stage of the main transmission (HG, HG'; SH5) prior to activating the target ratio stage of the range change group (GP, SH4).

4. The method according to claim 3, further comprising the step of essentially simultaneously changing the main transmission (HG, HG') on a shift gate of the target ratio stage and activating the target ratio stage of the range change group (GP, SH4) where a lowest ratio stage (G1, G1') and a highest ratio stage (G3, G4') are coordinated with different shift gates.

5. The method according to claim 1, further comprising the step of assisting adaptation of the rotational speed of the prime mover simultaneously with the synchronization of the target ratio stage of the main transmission (HG, HG'; SH6) by an actuating the transmission brake (Br>0).

6. The method according to claim 1, further comprising the step of changing the splitter group (GV) immediately after de-activation of the actual ratio stage of the main transmission (HG, SH5) during a range change up-shift that contains one change of a synchronized shiftable two-speed splitter group (GV) front-mounted on the main transmission (HG).

7. The method according to claim 1, further comprising the step of changing the splitter group (GV) simultaneously with the synchronization of the target ratio stage of the main transmission (HG, SH6) during a range change up-shift which contains a synchronized shiftable two-speed splitter group front-mounted on the main transmission (HG).

8. The method to claim 1, further comprising the step of partially disengaging the separating clutch (K) partially to above a slip limit during before reducing the load of the prime mover (SH1, SR1).

9. The method according to claim 1, further comprising the steps of continuing the shift sequence while maintaining an engagement control force when finding a tooth-on-tooth position of the dog clutch concerned occurring during activation of at least one of the target ratio stage of the main transmission (HG, HG'; SH7, SR4a) and the range change group (GP; SH4, SR6).

10. The method according to claim 1, further comprising the steps of using the method in a group transmission which has at least one synchronized part (HG, GP; HG', GP).

11. A method for shifting an automated group transmission situated in a drive train of a motor vehicle between a prime mover and an axle drive and comprising at least one multi-speed main transmission (HG, HG'), a two-speed range change group (GP) rear-mounted on the at least one multi-speed main transmission (HG, HG'), and the main transmission (HG, HG') is constructed in countershaft design having at least one countershaft ($W_{VG1}$, $W_{VG}$) provided with an actuatable transmission brake (Br), an input shaft ($W_{GE}$) is connected via an actuatable separating clutch (K) with the prime mover, the main transmission (HG, HG') and the range change group (GP), are shiftable via unsynchronized dog clutches combined in pairs in a common shift set (S1, S2, S1'–S3', SP) having two shift positions and one neutral position (N), wherein during a range change gearshift both in the main transmission (HG, NG') and in the range change group (GP) a change between two ratio stages occurs, wherein a range change down-shift comprises the steps of:

reducing (SH1) a load of the prime mover;

disengaging (SH2a) an actual ratio stage of the range change group (GP=N);

fully disengaging (SH2b) the separating clutch (K=0);

synchronizing (SH3a) a target ratio stage of the main transmission (HG) by actuation of the transmission brake (Br>0);

initiating (SH3b) actuation of the prime mover to the target rotational speed of the input shaft ($W_{GE}$);

activating (SH4) the target ratio stage of the main transmission (HG);

de-activating (SH5) the actual ratio stage of the range change group (GP=N);

synchronizing (SH6) the target ratio stage of the range change group (GP) by partially engaging the separating clutch (K>0);

activating (SH7) the target ratio stage of the range change group (GP);

fully engaging (SH8a) the separating clutch (K=1); and increasing (SH8b) the load of the prime mover.

12. The method according to claim 11, further comprising the step of essentially simultaneously changing the main transmission (HG, HG') on a shift gate of the target ratio stage and synchronizing the target ratio stage of the main transmission (HG, HG'; SR3a) where a lowest ratio stage (G1, G1') and a highest ratio stage (G3, G4') are coordinated with different shift gates.

13. The method according to claim 11, further comprising the step of changing the splitter group (GV) immediately before activation of the actual ratio stage of the main transmission (HG, SR4a) during a range change up-shift that contains one change of a synchronized shiftable two-speed splitter group (GV) front-mounted on the main transmission (HG).

\* \* \* \* \*